US010057131B1

(12) United States Patent
Brown

(10) Patent No.: US 10,057,131 B1
(45) Date of Patent: Aug. 21, 2018

(54) SYSTEM AND METHOD FOR TOPOLOGY-AWARE CONFIGURATION GENERATION

(71) Applicant: JPMorgan Chase Bank, N.A., New York, NY (US)

(72) Inventor: Zachary S. Brown, Galena, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 188 days.

(21) Appl. No.: 14/705,435

(22) Filed: May 6, 2015

(51) Int. Cl.
*G06F 15/16* (2006.01)
*H04L 12/24* (2006.01)

(52) U.S. Cl.
CPC .......... *H04L 41/12* (2013.01); *H04L 41/0853* (2013.01)

(58) Field of Classification Search
CPC ........................... H04L 41/12; H04L 41/0853
See application file for complete search history.

(56) References Cited

U.S. PATENT DOCUMENTS

| | | | | |
|---|---|---|---|---|
| 2005/0240990 | A1* | 10/2005 | Trutner | H04L 63/0227 726/11 |
| 2005/0243739 | A1* | 11/2005 | Anderson | H04L 29/12009 370/254 |
| 2010/0205281 | A1* | 8/2010 | Porter | H04L 41/12 709/220 |
| 2015/0127792 | A1* | 5/2015 | Messinger | H04L 41/0843 709/221 |
| 2016/0050116 | A1* | 2/2016 | Sheshadri | H04L 41/0843 709/221 |

* cited by examiner

*Primary Examiner* — Viet D Vu
(74) *Attorney, Agent, or Firm* — Calfee Halter & Griswold LLP

(57) ABSTRACT

Embodiments of the presently disclosed invention provide a method and system for dynamically configuring computer networks based on the topology of the network and the devices contained therein. In embodiments of the present invention, the topology-aware configuration generation method and system dynamically configures each of the devices found in the network topology based on each device type and the devices that are connected therewith.

17 Claims, 8 Drawing Sheets

SYSTEM AND METHOD FOR TOPOLOGY-AWARE CONFIGURATION GENERATION

FIELD OF THE INVENTION

Embodiments of the present invention are generally related to systems and methods for generating network configurations, and in particular, for dynamically generating topology aware network device configurations.

BACKGROUND OF THE INVENTION

Organizations in many fields and industries rely heavily on computer networks in day-to-day operations. These computer networks, which are often connected by complex networks of gateways, routers, switches, hubs, bridges and other devices, connect servers, business systems, and user devices within the organizations as well to external destinations such as the Internet.

The task of populating and configuring the components that connect a company's servers, business systems, and user devices is increasingly costly and time consuming, however. As companies grow in size, so do the complexities of these computer networks. Indeed, as the size of a computer network grows, so does the time and costs associated with designing and configuring the network to operate correctly and efficiently. For instance, to create a network, an organization's Information Technology personnel must often manually design the network infrastructure by determining what components are required based on organization's business requirements, including whether there are particular needs for specific network devices, such as gateways, routers, network bridges, switches, hubs, repeaters, etc.

The computer network design must not only identify what components are included in the network, but also how the network components are interconnected with one another so as to achieve the desired network performance and capabilities. Thus, even before physically implementing the networks, a network system designer must manually determine the configurations of each network component (e.g., gateways, routers, network bridges, switches, hubs, repeaters). For instance, a network designer must manually identify the Internet Protocol address (or IP address range) of each component, the DNS server for one or more device(s), the device name, the loop back addresses, point to point addresses, and other important information. There is no way to automatically generate the configuration information of each component based on the topology of the network.

While designing the network topology is itself a time consuming and costly task, a network engineer must also manually generate and configure each network component according to the network configurations set forth in the design. This process is also time consuming and often results in configuration errors that require additional troubleshooting, thereby further increasing costs and creating delays. As the topological size of the computer networks grow, the configuration complexities grow exponentially as well.

As business needs and technology change over time, established computer networks often need to be redesigned and reconfigured. This includes instances where the number of devices that should be supported by the computer network change. The redesign and reconfiguration phases often require the removal of old components and/or the addition of new components that, many times, require a complete reconfiguration of all components in the network. Without a reconfiguration of the components of the network, the components of the network would not be able to adequately and efficiently communicate with one another. Thus, even after networks have been configured, the potential costs to maintain the networks remain high.

Accordingly, there is a long-felt need for a solution to facilitate the design and configuration of computer networks and computer network components.

SUMMARY OF THE INVENTION

The present invention fulfills long-felt needs by providing a method and system that facilitates the configuration of computer networks and computer network components. In particular, embodiments of the present invention facilitate the configuration of computer networks and computer network components by generating network configuration files based on a dynamic awareness of the network topology configuration.

In one aspect of the present invention, a computer system for configuring a plurality of network devices based on a network topology architecture is disclosed. The system includes non-transitory computer memory including stored executable computer instructions and a programmable processor that executes at least a portion of the stored executable computer instructions. For instance, the execution of the stored executable computer instructions causes the system to receive network topology data of a computer network including a plurality of network devices and process device data and adjacency data of each of the plurality of network devices. The device data may include, for instance, the device type and the adjacency data, which may describe the connection of each of the plurality of network devices with other devices in the computer network. For each device of the plurality of network devices in the computer network, the system may select a device from the plurality of network devices for configuration; automatically generate a configuration file for the selected device based on the device data and the adjacency data of the selected device; and configure the selected device using the generated configuration file.

In another aspect, a computer implemented method for configuring a plurality of network devices based on a network topology architecture is disclosed. The method includes the steps of receiving network topology data of a computer network that includes a plurality of network devices; processing, using at least one programmable processor, device data of each of the plurality network devices, the device data including the device type; and processing, using the at least one programmable processor, adjacency data of each of the plurality of network devices. The adjacency data may describe the connection of each of the plurality of network devices with other devices in the computer network. In addition, for each device of the plurality of network devices in the computer network, performing, using at least one programmable processor, to select a device from the plurality of network devices for configuration; automatically generate a configuration file for the selected device based on the device data and the adjacency data of the selected device; and configure the selected device using the generated configuration file.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the presently disclosed invention provide a method and system for dynamically configuring computer networks based on the topology of the network and the devices contained therein. In embodiments of the present invention, the topology-aware configuration generation method and system dynamically configures each of the devices found in the network topology based on each device type and the devices that are connected therewith.

Figure 1:
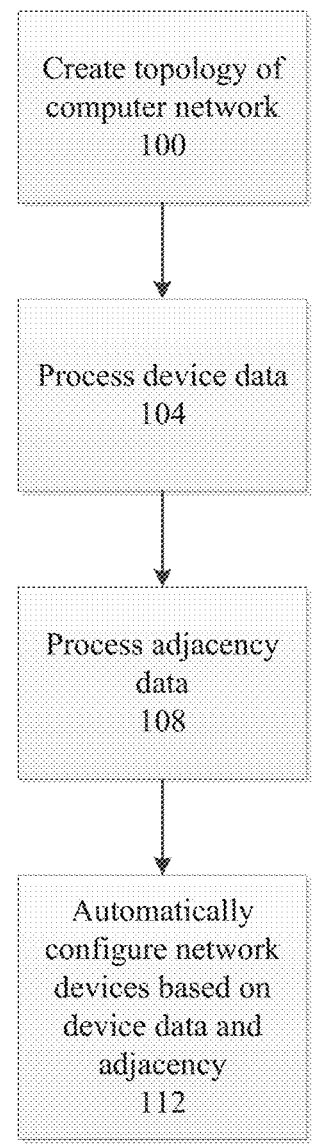
FIG. 1 depicts a flowchart of a method for dynamically generating computer network configurations based on the topology of the computer network in accordance with an embodiment of the present invention.

FIG. 1 depicts a flowchart of a method for dynamically generating computer network configurations based on the topology of the computer network in accordance with an embodiment of the present invention. At 100, the method begins with creating a topology of a computer network.

Figure 2:
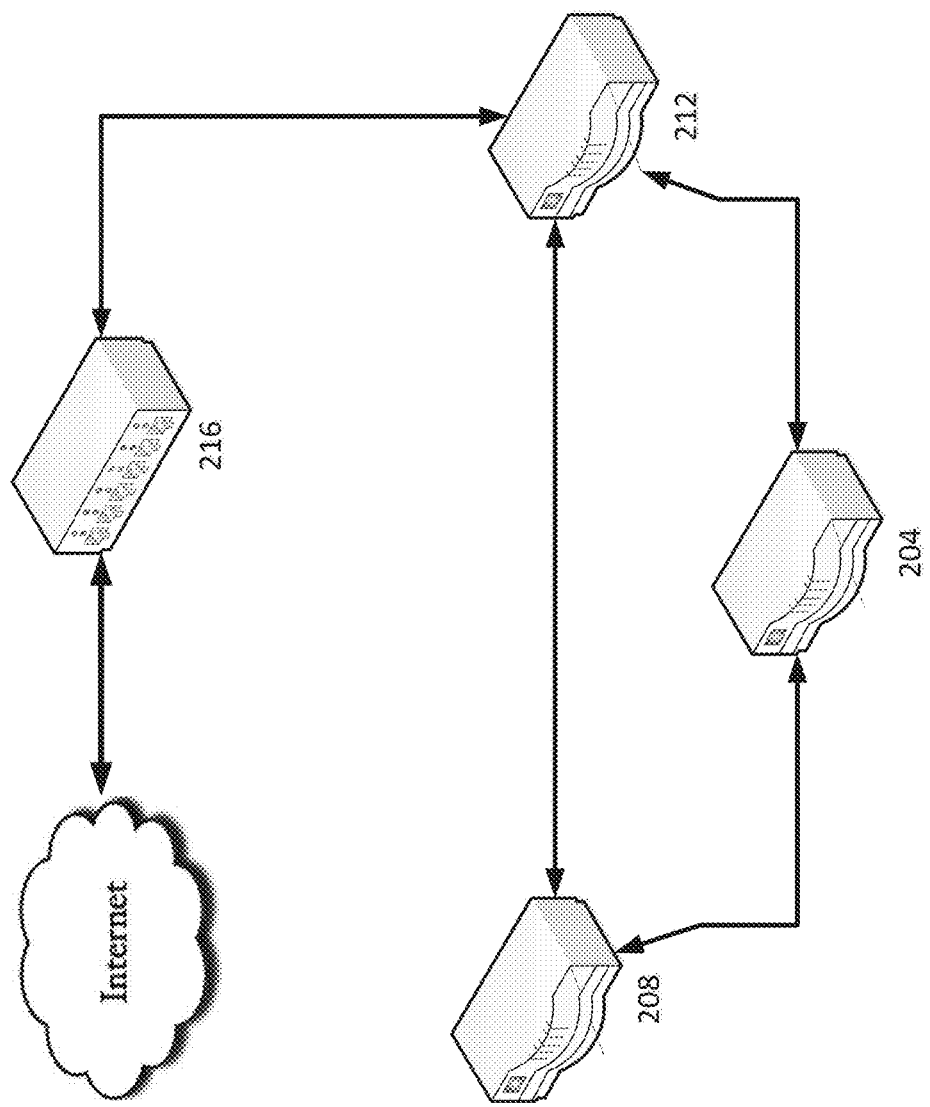
FIG. 2 depicts an exemplary computer network topology in accordance with an embodiment of the present invention.

FIG. 2 depicts an exemplary computer network topology in accordance with an embodiment of the present invention. FIG. 2 depicts an exemplary computer network topology that includes network devices 204, 208, 212, and 216. The network devices 204, 208, 212 and 216 are connected with one another in a number of configurations, as visualized by the lines connecting the nodes representing network devices 204, 208, 212 and 216. As seen, network device 204 is adjacent to network device 208, 212 and 216; network device 208 is adjacent to network device 204 and 208; network device 212 is adjacent to network device 204, 212, and 216; and network device 216 is adjacent to network device 212.

The network devices 204, 208, 212 and 216 may be various types of network devices well known in the art and generally utilized in computer networks. For instance, the network devices may be any of the following and variations thereof: gateways, routers, network bridges, switches, hubs, repeaters, multilayer switches, protocol converters, bridge routers, proxy servers, firewall devices, network address translators, multiplexors, network interface controllers, wireless network interface controllers, modems, ISDN terminal adapters, line drivers, and wireless access points. In addition, the network devices supported by embodiments of the present invention may also operate via circuit switching, message switching, packet switching, or other forms of communication protocols.

In one example, network device 204, 208 and 212 are network switches and network device 216 is a gateway that connects to the Internet 220. Prior to the presently disclosed invention, a network engineer, after having determined that the network should include network devices 204, 208, 212 and 216, must determine how to optimally connect these devices, and how to configure these devices so as to allow network devices 204, 208, and 212 to be connected to one another and for network device 212 to be connected to the gateway device, network device 216. With embodiments of the present invention, an optimized and efficient network topology is created based on the topology requirements, e.g., with the topology map of FIG. 2.

At 104, device data is processed for each of the network devices 204, 208, 212 and 216. Each device is a particular device type. In one embodiment, each device type may be associated with a device template. Thus, the device data defined by the device template of each device type of devices 204, 208, 212 and 216 may be processed at 104. Thus, templates may allow for device data, and as seen below, adjacency data, to be defined for a plurality of devices having similar attributes. For instance, a template may define the default device configuration for all devices of a particular type, such as a gateway. By defining the templates, embodiments of the present invention allows for an even more efficient generation of configuration file. As additional devices of the same device type are added to the network topology, the device data associated with these new devices may be automatically generated based on the device templates for that device type, in accordance with at least one embodiment of the present invention.

At 108, adjacency data is processed for each of the devices 204, 208, 212 and 216. As with the device templates, each possible type of adjacency may be associated with an adjacency template. For instance, an adjacency template may be defined for an adjacency between device types of devices 204 and 208. Therefore, at 108, the adjacency data defined by the adjacency template of each set of device types may be processed.

The device data may describe the role each device will play within the topology. Device data may include device snippet information that defines the device type, including whether the device will be configured as, e.g., a network gateway, router, network bridge, switch, hub, repeaters, multilayer switch, protocol converter, bridge router, proxy server, firewall device, network address translator, multiplexor, network interface controller, wireless network interface controller, modems, ISDN terminal adapter, line driver, wireless access point, and so on. In addition, the device data may relate to the network device's IP address, device name and identification, gateway (e.g., default gateways), subnet mask(s), router address(es), associated accounts and email addresses, host name, network protocol, network mode (e.g., DHCP, etc.), active/inactive port(s), DNS server address(es), TFTP server address(es), firewall settings, loop back addresses, point to point addresses, supported IP range, and other information.

Adjacency data may describe the devices that are adjacent to each of the network devices in the network topology. The devices may be physically or logically adjacent to one another. In one embodiment, this information is dynamically generated based on the topology map. The adjacency data may describe the network device type and other information of the adjacent device. Thus, for instance, the adjacency data describes that network device 204 is adjacent to network switches (network devices) 208, 212 and 216; network device 208 is adjacent to network switches (network devices) 204 and 208; network device 212 is adjacent to network switches (network devices) 204, 212, and gateway 216; and network device 216 is adjacent to network switch 212. Adjacency data may also describe how the connected devices communicate with one another, including the communication mode, protocol, security, direction and information utilized in the art.

As described further below, device and adjacency data entries may be defined based on one or more variables. By defining configuration data fields using variables, values may be dynamically calculated and/or retrieved from one or more internal and external sources for any given device data entry that describes a device, adjacency and templates. In addition, each device may be assigned an index value within the adjacency based on the device type.

In one embodiment, after the device data for one or more devices in the topology has been defined or processed, the additions of new devices to the network topology may automatically cause adjacency data for the new device to be dynamically determined based on how the new device is connected to other devices in the network. As new devices are added, the configuration files of the new devices may be generated based on defined device and adjacency templates and configuration files or existing devices may be automatically regenerated as a result of the addition of the new device into the network.

At 112, based on the device file processed at 104 and the adjacency data processed at 108, the network devices 204, 208, 212, and 216 are automatically configured. For instance, in one embodiment, the network configuration files are automatically generated for each of the devices 204, 208, 212, and 216. The configuration files may be automatically installed at each of the devices 204, 208, 212, and 216. Therefore, based on the device and adjacency data of each device, each of the devices 204, 208, 212 and 216 are automatically configured with all of the necessary information and configuration settings necessary to communicate with each of the devices according to the network topology according as the configured device type. Thus, network switches 204, 208, and 212 may be configured to connect laptops, computers, smartphones, servers, and other devices within the network by receiving, processing and forwarding packet data to one or more destination devices also found in the network. These network devices may be configured to recognize the other network switches 204, 208, and 212, as well as gateway 216 and will automatically know how and where to forward network packets in order to ensure that the packets are received at the one or more destination devices. For instance, where packets are received by network switch 204 with a destination external to the network (e.g., a destination connected to the Internet) network switch 204 may be configured to automatically forward the packets to network switch 212. Similarly, network switch 212, having received the same packets, may be configured to automatically forward the packets to the gateway 216. Finally, gateway 216, having received the same packets, may be automatically configured to forward the packets to the destination address on the Internet.

In one embodiment, the device data and the adjacency data further include global variables and rules that are considered in configuring all of the network devices. Information such as a default DNS address, the IP address ranges of the network devices 204, 208, 212, and 216, may be globally defined and considered when the network devices are configured. As further described below, the configurations of the network devices may be dependent on one or more configuration rules. In addition, configuration information may also be dependent on configuration pools, which include a pool of identifiable information that may be assigned to one or more devices based on the device types or other aspects of the device.

Figure 3:
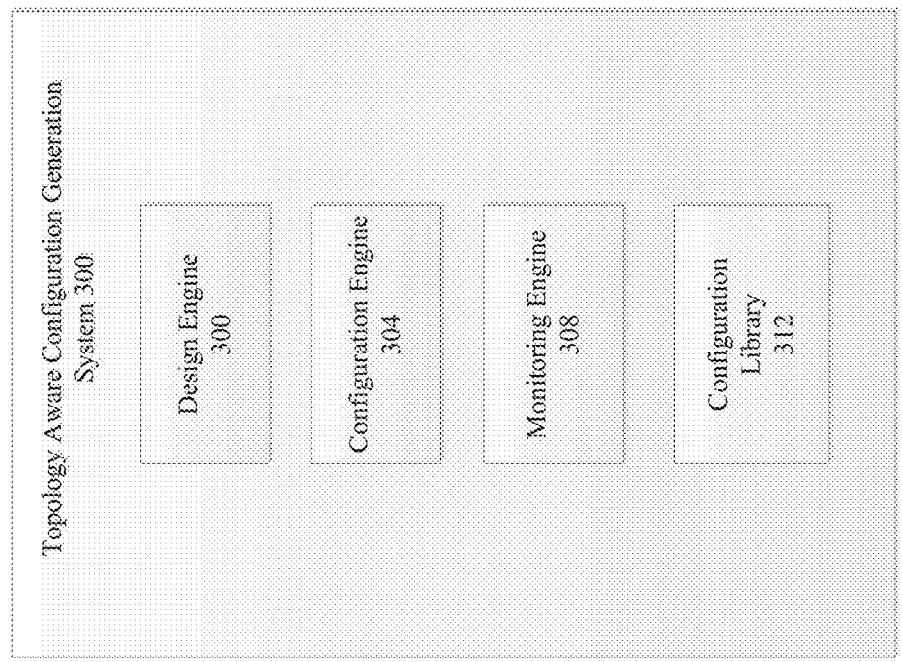
FIG. 3 is a block diagram illustrating a topology aware configuration generation system 300 in accordance with at least one embodiment of the present invention.

FIG. 3 is a block diagram illustrating a topology aware configuration generation system 300 in accordance with at least one embodiment of the present invention. The system, as illustrated, includes a design engine 300, a configuration engine 304, monitoring engine 308, and a configuration library 312.

The design engine 300 facilitates the design of a network topology map. For instance, the design engine 300 generates a user interface that allows users to define the network devices making up the network topology. In addition, the design engine 300 may define device data, adjacency data, global variables, and other information that facilitates the configuration of the network devices of one or more computer networks. As a result, embodiments of the present invention further facilitate the creation of device and adjacency templates.

The configuration engine 304 utilizes the configuration data collected via the design engine 300 to generate the configuration information and files to cause the network devices to operate with one another in accordance with the network topology. In one embodiment, the configuration engine 304 dynamically updates the configuration information of each network device in real time as new devices are added to the network topology. Furthermore, configuration engine 304 dynamically updates the configuration information of each network device in real time as device data, adjacency data, and global variables are defined and/or modified. In one embodiment, the configuration engine 304 may automatically provide a recommended configuration based on the network topology and the configuration of devices already configured and/or are already part of the network.

In one embodiment, the configuration engine 304 configures the devices by generating a configuration file in accordance with each device type, model and version. In this embodiment, the configuration engine 304 accesses a library of configuration file generation modules and executes one or more selected configuration file generation modules based on the particular device being updated. The generate configuration file may be installed.

The monitoring engine 308 may allow the embodiments of the presently disclosed system to monitor one or more networks and to automatically configure the network devices in accordance with the configuration engine 312. In one embodiment, the monitoring engine 308 monitors the network for new devices and may automatically configure the network devices according to the network topology. The monitoring engine 308, for instance, may automatically detect the device type and the adjacency data by determining what device(s) are connected to the newly added device. Based on the information, the monitoring engine 308, in conjunction with the configuration engine 312, may automatically configure and/or recommend a configuration to a user so as to facilitate the operations of the newly added device in the network topology. In embodiments in which templates are utilized, the monitoring engine 308, in conjunction with the configuration engine 312, automatically populates the device and adjacency data for the new device any newly inserted adjacencies using previously defined templates (e.g., template for the device type). The system may notify a user (e.g., a network systems engineer) of the new devices and may recommend configuration information.

In one embodiment, the monitoring engine 308 causes one or more network devices in a given network topology to gather device and adjacency information of the network devices in the network topology. For instance, the monitoring engine 308 discovers each of the devices in the computer network as well as how the devices are connected with one another. For instance, the monitoring engine 308 may transmit a request to all devices in the computer network requesting information regarding the device. In addition, the transmission of the monitoring engine 308 may also include an instruct signal that, when processed by each network device, causes the network device to automatically determine the particular identification of all connected devices. Each of the devices may then return the identification and adjacency information back to the monitoring engine 308 for processing.

Based on the information returned from each device within the network, the monitoring engine 308 is capable of automatically mapping out each network device, determining how each device is connected with one another, and the configuration information of all devices within the network topology.

In this and other embodiments of the present invention, the system may be connected to one or more existing computer networks to: automatically detect the network's topology and to populate the device data and adjacency data of every device in the existing computer networks, thereby allowing users to quickly analyze the network topology of existing networks and make modifications to these network topology and device configurations with ease.

The configuration library 312 may include one or more databases stored in computer memory that include device data, adjacency data, global variables and/or rules, and default settings for one or more network topologies. In one embodiment, the configuration library 312 may further include a dynamically created library that stores historical configuration information used by the users associated with the internal network as well as historical configuration information utilized by other users and computer systems worldwide. In this embodiment, the data may be utilized by the configuration engine 312 to dynamically select and provide a recommended configuration to a user based on user data and preferences. The configuration library 312 further includes data describing the device and adjacency templates.

Figure 4:
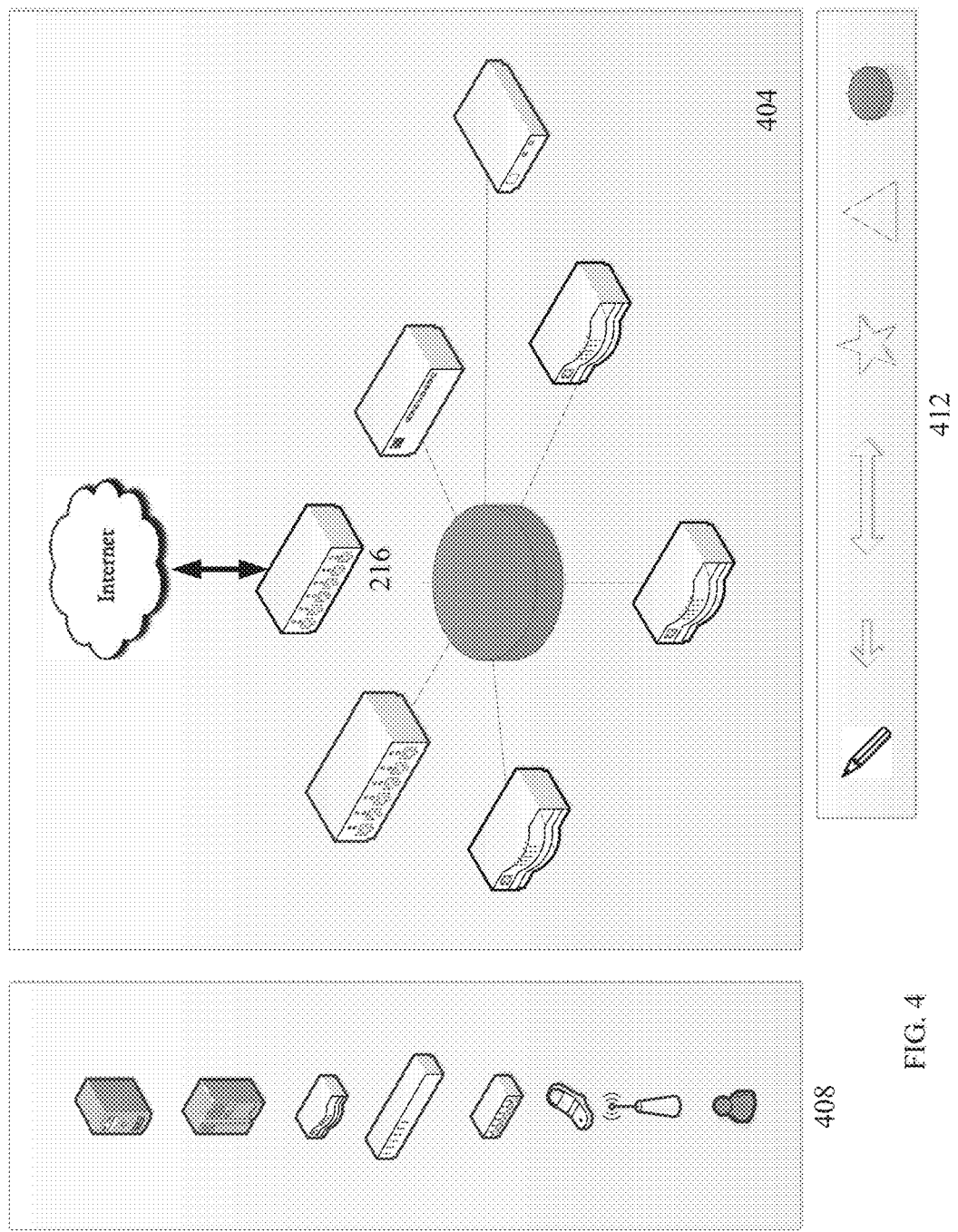
FIG. 4 depicts graphical user interface (GUI) generated by a design engine in accordance with an embodiment of the present invention.

FIG. 4 depicts graphical user interface (GUI) generated by the design engine in accordance with an embodiment of the present invention. As seen, the graphical user interface 400 includes a topology map 404, a device library 408, and a drawing tool 412.

In one embodiment, a user using the graphical user interface 400 may interactively manipulate the components depicted in the network topology map. A user, for example, may select a device type from a device library 408 and may drag and drop the selected device onto the network topology map 404. In addition, a user may utilize the drawing tool 412, which may provide the ability to draw lines connecting two or more network devices to represent an adjacency relationship between two network devices. In addition, the drawing tool 412 may allow for connections (i.e., adjacencies) to be drawn to connect multiple devices using various network topology architectures by connecting a plurality of network devices with one or more figures, such as circles, triangles, and so on. Devices may be connected to multiple adjacencies. Indeed, the drawing tool 412 allows a user to design a network topology in any number of different types of topological network architecture, including networks that are structured in a hierarchical (tree) topology, a bus network topology, star network topology, token ring network topology, ring network topology, mesh network topology, and leaf-spine network topology, logical/signal topology, and others.

When a user selects an instance of a gateway from the device library 408 and places the device within topology map 404, the device data may be automatically populated based on configured topology or based on device and adjacency templates. Similarly, when a user inserts new adjacency data into the topology map, the adjacency data for the adjacency relationship may automatically be populated based on the network devices connected to the one or more devices, adjacency template information, or other variables and information. For instance, a newly added gateway may be assigned a default IP address, DNS address, and other information based on default settings and/or global rules and/or variables.

In one embodiment, configuration of the devices within a network may change dynamically in response to the addition of new devices or new adjacencies to the network topology map. Furthermore, configuration of the devices within a network may change dynamically in response to the modifications of the devices or modifications to the adjacency data found in the network topology map. For instance, when a user inserts a new gateway and connects the gateway to a network bridge, the network bridge may automatically add the new gateway to its list of known network gateways. The devices that are dynamically updated need not be directly connected to the new devices. Rather, based on the device(s) and/or adjacency information added to the network topology, any one or more of the device(s) within the topology may be dynamically updated to ensure proper operations within the network.

Figure 5:
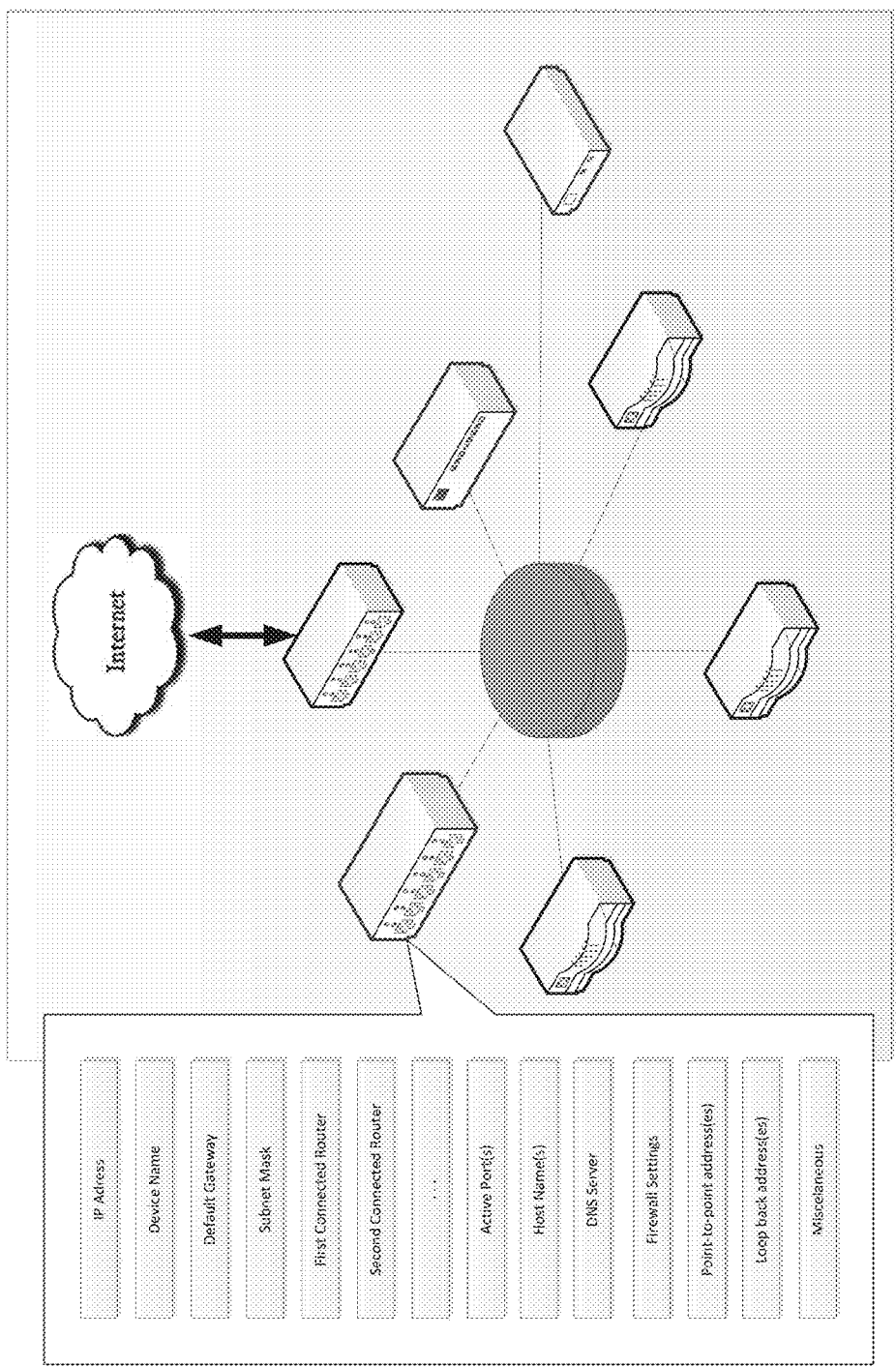
FIG. 5 depicts the use the device tool in accordance with an embodiment of the present invention.

Using the graphical user interface 400, a user may customize the device data according to project requirements using a device tool, as seen in FIG. 5, which depicts the device tool 504 within the user interface in accordance with an embodiment of the present invention. In the illustrated example, the device tool 504 provides a menu through which a user may define a device type template, including, but not limited to, IP address, device name and identification, gateway (e.g., default gateways), subnet mask(s), router address(es), associated accounts and email addresses, host name, network protocol, network mode (e.g., DHCP, etc.), active/inactive port(s), DNS server address(es), TFTP server address(es), firewall settings, loop back addresses, point-to-point addresses, supported IP range, and other information. As the user modifies the device type template using the device tool 504, the configuration information of other devices may change dynamically. For instance, if the user changes the IP address of the gateway, other devices within the network topology that are adjacent to or assigned to the new gateway may automatically modify its configured default gateway IP address accordingly. The device tool 504 may also be used to define the device data of a particular device within the topology.

Figure 6:
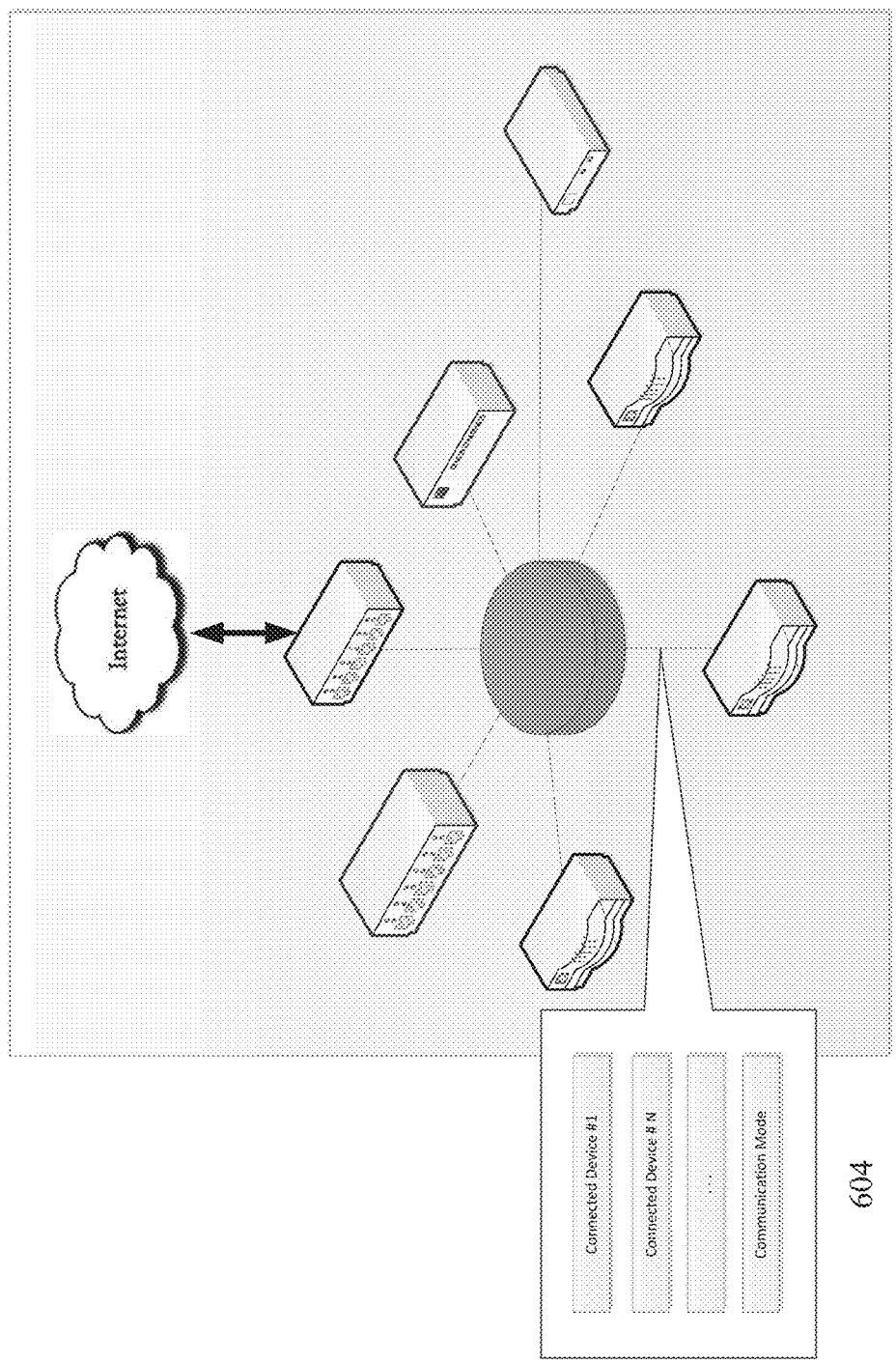
FIG. 6 depicts the use of the adjacency tool in accordance with an embodiment of the present invention.

FIG. 6 depicts a graphical user interface 600 after a user has selected a line between two or more device(s), which represents the devices' adjacency relationship. The adjacency data tool provides the capability to define adjacency templates and to define adjacency data of the adjacencies. Thus, an adjacency template may be defined for adjacencies between a first type of device (e.g., gateway) and a second type of device (e.g., network hub). In one embodiment, based on the configuration of the adjacency templates between these two device types, the adjacency data for all later added adjacencies between the same device types may be automatically determined and used as a default configuration. In one further embodiment, device and adjacency templates provide the default device and adjacency configuration information based on the device types, device models, device versions, or other attributes. Thus, templates may be defined for any particular class or grouping of devices and/or adjacencies based on any common attribute.

Thus, a user may utilize the adjacency data tool to customize the adjacency data. Based on the user's entries, the network topology map may dynamically update. For instance, where a device is no longer connected to a group of devices (e.g., in a spine-leaf network topology architecture), the network topology map depicted in the graphical user interface may remove a line connecting the device removed from the group of adjacent device(s).

As seen above, embodiments of the present invention process adjacencies as individual elements of the topology with respective variable information. This feature allows, for instance, for a point-to-point interface to be defined. A variable may be utilized to facilitate assigning a /30 subnet to the adjacency. As a result, the system recognizes that this /30 subnet as part of the adjacency. Based on an index value assigned per device type per adjacency, the system may automatically calculate the IP addresses each device gets in the adjacency.

Figure 7:
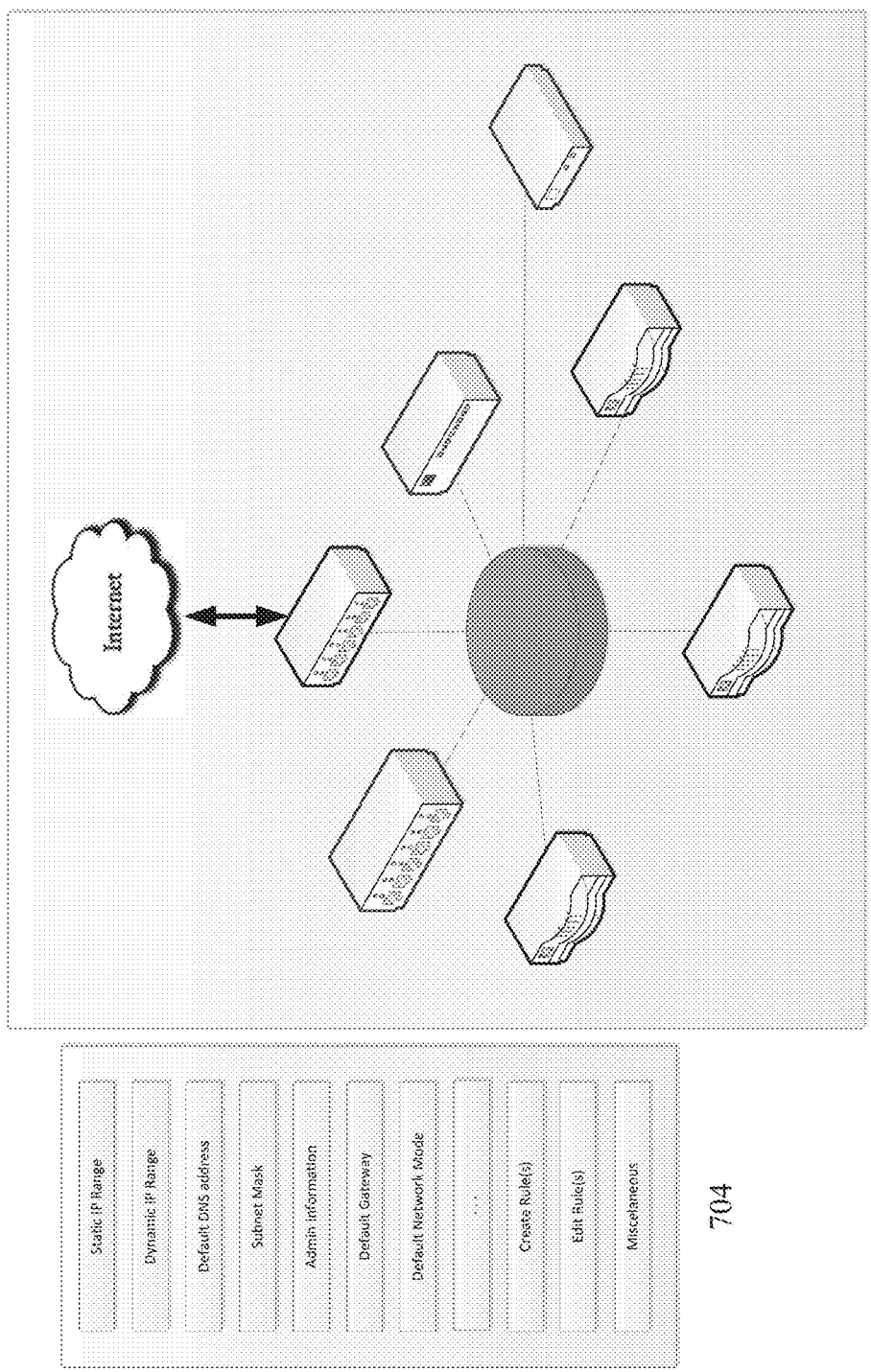
FIG. 7 depicts a graphical user interface 700 that depicts the global variable tool in accordance with an embodiment of the present invention.

FIG. 7 depicts a graphical user interface 700 that includes a global variable tool in accordance with an embodiment of the present invention. Through the use of the global variable tool 424, a user may define default configuration information (e.g., a default DNS address, subnet mask, loop back addresses, point-to-point addresses, etc.). In addition, global variables may define any configuration information that may be applied or considered across two or more devices. For instance, the global variables may list the allowable ranges of static or dynamic IP addresses assignable to one or more devices in the network. A user may utilize the global variable tool 424 in conjunction with user-definable rules. For instance, a user may create a rule that certain global variables are to apply to only particular types of network device types, such as all network switches should be assigned IP addresses in the ranges of 192.168.1.102 to 192.168.1.108 and that wireless hubs should have a default gateway address of 192.168.1.200.

In addition to the foregoing, the following provides an exemplary listing of configurable data variables that may utilize in configuring the device data and the adjacent data for a given device. With variables, dynamic values may be generated for device data and adjacent data fields dynamically. The provided list is for exemplary purposes only, as other variables may be defined in accordance with other embodiments of the present invention.

| Name | Example | Description |
| --- | --- | --- |
| IP Address | 1.2.3.4 | A valid internet protocol (IP) address. No mask may not be necessary. This field further supports IP address math (e.g., addition, subtraction operators). For instance, with the variable [Address1, a + 1], the IP address will be automatically assigned based on the mathematics. |
| Digit | Any Number (Not Null) | A number field. This variable supports math operators. |
| E-Mail Address | a@a.com | Email address |
| Iterator | start, stop, step, variable | The subtype of this variable is the text that could be repeated. The values for this variable, takes the format start, stop, step, variable. The system iterates iterate from start to stop by the step variable, replacing variable specifed with the iteration number it is on. For instance, the data may indicate: "Interface_Iterator,finterface FastEthernet 2/X no shut ]. In this example, any data after the "f" in the type field is the text to be repeated including any carriage returns. If the iterator is set as 3, 1, −1, X, the system may count from 3 to 1 (by steps of −1). With the above example, the output would be: interface FastEthernet 2/3 no shut interface FastEthernet 2/2 no shut interface FastEthernet 2/1 no shut |
| IP Address/ Mask | 10.11.12. 1/5 | An internet protocol (IP) address with mask. Once entered depending on the variable sub-type that is specified, the system may automatically generate the address and mask. This variable type supports IP math. The sub-types may include the following: a: Address - Prints the IP address n: Network - Will print the network address b: Broadcast - Will print the broadcast address c: CIDR - Will print the CIDR bitmask number (no slash) m: Netmask - Will print the full netmask i: Inverse Mask - Will print the full inverse mask |
| Adjacent Variable | | The adjacent variable allows for the referencing of variables for one or more adjacency. For instance, the system allows for the following configuration: adjacent.device_type_name.varaible_name, jX%type adjacent.adjacency_type_name.varaible_name, jX%type adjacent.varaible_name, jX%type |

| Name | Example | Description |
|---|---|---|
| | | The variable "j" indicates an adjacent scope variable. The system may then retrieve a device type or adjacency type.<br>If neither the device type nor adjacency type are specified, the system may attempt to look for the device type through other sources. |
| Long Text | Any Multiline Text | The long text field allows for the entering of any value, including a blank value. |
| IP Iterator | Multiple IPs | An IP Iterator causes the system to repeat the entire line of the configuration file for each value entered in this field. This variable supports IP math.<br>For example, by using the following entry in the device data, snmp-server [SNMP_Server,m] <– Line in configuring the device data, and by assigning the SNMP Server variable as 1.1.1.1 and 2.2.2.2, the resulting configuration file generated by the system would include the following entry:<br>snmp-server 1.1.1.1<br>snmp-server 2.2.2.2 |
| IP/Network Iterator | Multiple IPs with Masks | An IP/Network iterator causes the system to repeat the entire line of the configuration for each value entered in this field. The IP/Network iterator has sub-types for printing different types, including:<br>a: Print just the address<br>c: Print the address and CIDR notation 1.1.1.0/24<br>n: Print the NETWORK address and the netmask 1.1.1.0 255.255.255.0<br>i: Print the NETWORK address and Inverse mask 1.1.1.0 0.0.0.255<br>For example, by using the following entry in the device data:<br>permit ip [Source_addresses, ni][Dest_addresses, ni] and by assigning the source addresses as 1.1.1.1/24 and 2.2.2.2/24 and the destination addresses as 3.3.3.3/24 and 4.4.4.4/24, the resulting configuration file generated by the system would include the following entry:<br>permit ip 1.1.1.0 0.0.0.255 3.3.3.0 0.0.0.255<br>permit ip 1.1.1.0 0.0.0.255 4.4.4.0 0.0.0.255<br>permit ip 2.2.2.0 0.0.0.255 3.3.3.0 0.0.0.255<br>permit ip 2.2.2.0 0.0.0.255 4.4.4.0 0.0.0.255 |
| Project Variable | | The project variable allows for referencing variables over the entirety of a project. You must specify:<br>project.device_type_name.variable_name, pX%type<br>project.adjacency_type_name.varaible_name, pX%type<br>project.varaible_name, pX%type<br>The p indicates a project scope variable which the system will pull in all of based on it matching a device type or adjacency type. If neither the device type nor adjacency type are specified, the system may attempt to look everywhere.<br>The subtype indicates the type of variable and what to do with it.<br>p: No subtype indicates to just reference the individual variables without modification<br>pa(+-MATH): Indicates an IP address and you want just the address by itself: 1.2.3.4<br>pb(+-MATH): Indicates an IP address and you want just the network by itself: 1.2.3.0<br>pc(+-MATH): Indicates an IP address and you want cidr notation: 1.2.3.4/5<br>pm(+-MATH): Indicates an IP address and you want IP plus netmask: 1.2.3.4 255.255.128.0<br>pn(+-MATH): Indicates an IP address and you want network address plus netmask: 1.2.3.0 255.255.255.0<br>pi(+-MATH): Indicates an IP address and you want network address plus inverse netmask: 1.2.3.0 0.0.0.255<br>pd(+-MATH): Indicates an IP address and you want network address plus cidr: 1.2.3.0/24<br>pt: Indicates text<br>pg: Indicates this is an NETWORK and we'll attempt to aggregate the NETWORKSs into a network and netmask: 1.2.0.0 255.255.0.0<br>ph: Indicates this is an NETWORK and we'll attempt to aggregate the NETWORKSs into a network and inverse netmask: 1.2.0.0 0.0.255.255<br>pr: Indicates this is an NETWORK and we'll attempt to aggregate the NETWORKSs into a network and netmask: 1.2.0.0/16<br>ps: Indicates this is an IP and we'll attempt to aggregate the IPs into a network and netmask: 1.2.3.4 255.255.255.255<br>pt: Indicates this is an IP and we'll attempt to aggregate the IPs into a network and inverse netmask: 1.2.3.4 0.0.0.0<br>py: Indicates this is an IP and we'll attempt to aggregate the IPs into a network and netmask: 1.2.3.4/32<br>The type field indicates what to do with the multiple values:<br>line: Indicates the line the variables is on should be repeated once for each instance |

-continued

| Name | Example | Description |
|---|---|---|
| | | space: Indicates the values should be concatenated and separated with a space |
| | | none: Indicates the values should be concatenated (without a space) |
| String | Any Text (Null OK) | A string type. |
| Text | Any Text (Not NULL) | Similar to a string type, except that blanks are not allowed. |
| System Variable | | System variables allow for system variables to be retrieved and placed in the configuration files. The variable name may be specified directly after the variable type field. Supported system variables include:<br>user_id: Unique system ID. (Integer value)<br>user_name: Users login name. (Standard ID)<br>user_full_name: Users full name<br>user_email: Users e-mail address.<br>For instance, by including the following variable in defining device data: [UN,xuser_full_name], the generated configuration file would include the full user name. |

In addition to the foregoing, embodiments of the present invention further allows for the use of variables in defining adjacency data, including, but not limited to the following examples:

| Name | Example | Description |
|---|---|---|
| $0, $1, $2..etc | GigabitEthernet1/1 | $# designator represents a variable that will be specified as part of the adjacency.<br>Multiple values are separated with a pipe '|' and they will be assigned to $0, $1 and so on. For instance, this variable may be used to provide the interfaces relating to one or more adjacent devices. |
| remote.VARIABLE | remote.p2p, ia + index | The remote variable key allows for referencing the remote adjacency configuration variables. An example of this may include circumstances where there is a point-to-point address between you and your neighbor. |
| remote.config.VARIABLE | remote.config.device_name | The remote.config variable key allows for referencing a variable in the remote device's main configuration inside of an adjacency.<br>The example remote.device.device_name references the device name of the remote adjacency. |
| $0, $1, $2..etc | GigabitEthernet1/1 | This $# designator represents a variable that may be specified as part of the adjacency. Multiple values are separated with a pipe '|' and they will be assigned to $0, $1 and so on. These are usually used to provide the interface names to the adjacency. |

Embodiments of the present invention further allows for the use of variables in defining global data, including, but not limited to the following examples:

| Name | Example | Description |
|---|---|---|
| IP_VARIABLE, DETAIL%POOL, SIZE | p2p,ia%p2p_pool,31 | Allows for the designation of a pool of names or values (e.g., device names) from which the system may select in generating the configuration files for each of the devices of the topology. |
| DEVICE_NAME.CONFIG.VARIABLE_NAME, DETAIL | leaf01.config.loopback0,ia | Allows for referencing the name of a specific device name within the configuration. |
| PROJECT.DEVICE_TYPE.VARIABLE, DETAIL | project.leaf.eth0, ia%line project.leaf_spin | An iterator type that allows for the combining of data from a plurality of devices based on device type or adjacency types. |

| Name | Example | Description |
| --- | --- | --- |
| PROJECT.ADJACENCY_TYPE.VARIABLE,DETAIL%ITERATION_TYPE | e.p2p,ia%space | |
| #EXPRESSION | index==1?1:0 | Causes the system to process the logic expression and to return a value (e.g., true or false). |

Figure 8:
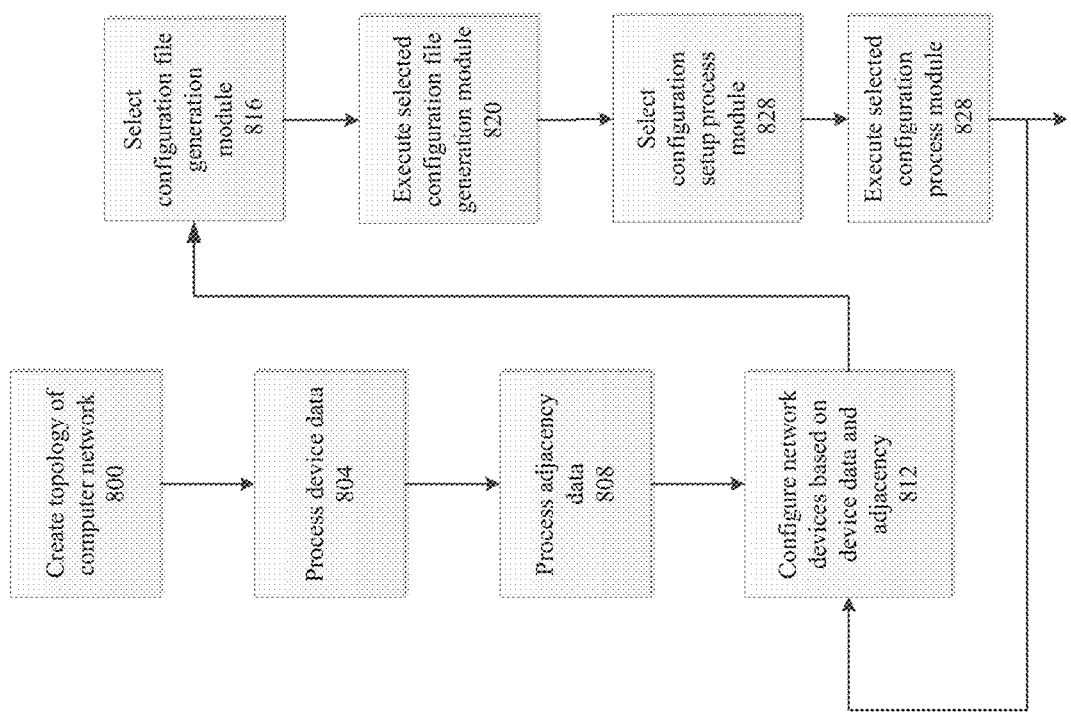
FIG. 8 depicts a flowchart of a method for dynamically configuring a plurality of network devices based on the topology of the computer network using a computer system comprising memory and a programmable processor in accordance with an embodiment of the present invention.

FIG. 8 depicts a flowchart of a method for dynamically configuring a plurality of network devices based on the topology of the computer network using a computer system comprising memory and a programmable processor in accordance with an embodiment of the present invention. At 800, the method begins with the computer system, using at least one processor, creating a topology of a computer network. At 804, device data is processed for each of the network devices of the network topology. At 808, adjacency data is processed for network devices of the network topology. Steps 804 and 808 may include steps of processing the device template data and the adjacency template data based on the device types of each of the devices in the topology.

Beginning at 812, embodiments of the present invention generate a configuration file for each of the network devices based on the device data processed at 804 and the adjacency data processed at 808 so as to ensure that each properly communicate with one another in accordance with the network topology. In particular, at 812, the computer system accesses a library of configuration file generation modules stored in a configuration library. At 816, the system selects a configuration file generation module based on the particular device being updated, such as based on the device type, model and version. At 820, based on the selected configuration file generation module, the system executes the module so as to generate a configuration file based on the device data processed at 804 and the adjacency data processed at 808.

Beginning at 824, embodiments of the present invention dynamically configure the device using the generated configuration file. Thus, at 824, for instance, the system may communicate with the network device and may initiate a configuration setup process with respect to the device. In one embodiment, at 824, the system selects from the configuration library an executable configuration setup module based on the device type, model and version of the particular network device. At 828, the system executes the selected configuration setup process. In one example, the execution of the selected executable configuration setup module causes the system to transmit a series of setup commands to the network device to configure the device. The commands may incorporate portions or all of the configuration file in configuring the network device. The system may also upload and install the configuration file as part of this process.

After 828, the system determines whether there are additional network devices that require configuration. If there are devices that still require configuration, the system repeats 812-828 in accordance with at least one embodiment of the present invention.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, microcontroller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

It should also be readily apparent to one of ordinary skill in the art that the presently disclosed invention may be implemented in a wide range of industries. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer system for configuring a plurality of network devices based on a network topology architecture, the system comprising:
non-transitory computer memory including stored executable computer instructions; a programmable processor, the programmable processor executing at least a portion of the stored executable computer instructions to perform at least the following:
receiving network topology data of a computer network that includes a plurality of network devices, the network topology data including at least data related to the logical arrangements of a plurality of network devices connected to the computer network;
automatically detecting a device template and an adjacency template by transmitting at least one command to each network device of the plurality of network devices, the command causing each network device to:
generate device information;
generate adjacency information describing the adjacent network devices of each device; and
transmit the device information and adjacency information to the computer system for configuring a plurality of network devices based on a network topology architecture;
processing a device template for each device type of the plurality network devices, the device template including device data for each device type;
processing an adjacency template for each type of adjacency in the network topology, each adjacency template including adjacency data at least describing connection of two or more network device types, wherein the adjacency data of each adjacency template is not associated with the computer network; and
for each device of the plurality of network devices in the computer network, performing at least the following:
select a device from the plurality of network devices for configuration;
automatically generate a configuration file for the selected device based on a device template and at least one adjacency template associated with the selected device; and configure the selected device using the generated configuration file.

2. The computer system for configuring a plurality of network devices based on a network topology architecture of claim 1, wherein the configuration file is generated based at least on the device type of network devices adjacent to each selected network device.

3. The computer system for configuring a plurality of network devices based on a network topology architecture of claim 1, wherein the programmable processor further executes stored executable computer instructions to perform at least the following:
receiving global variable data;
wherein the configuration file generated for each of the plurality of the network devices in the computer network is based in part on at least the global variable data.

4. The computer system for configuring a plurality of network devices based on a network topology architecture of claim 1, wherein the programmable processor further executes stored executable computer instructions to perform at least the following:
receiving a modification to at least one of the network topology data, a device template associated with one or more of the plurality network devices, and a adjacency template;
for each device of the plurality of network devices in the computer network associated with the modification, performing at least the following:
select a device from the plurality of network devices for configuration based on the modification;
automatically regenerate a configuration file for the selected device based on a device template and at least one adjacency template associated with the selected device; and
automatically configure the selected device using the regenerated configuration file.

5. The computer system for configuring a plurality of network devices based on a network topology architecture of claim 1, wherein the programmable processor further executes stored executable computer instructions to perform at least the following:
for each device of the plurality of network devices in the computer network, performing at least the following:
select a configuration file generation module from a library of configuration file generation modules based at least on a device type of the selected device, the selected module being executable by a computer processor; and
execute the configuration file generation module to generate the configuration file for the selected device.

6. The computer system for configuring a plurality of network devices based on a network topology architecture of claim 5, wherein the programmable processor further executes stored executable computer instructions to perform at least the following:
for each device of the plurality of network devices in the computer network, performing at least the following:
select a configuration setup module from a library of configuration setup modules based at least on a device type of the selected device, the selected module being executable by a computer processor; and
execute the configuration setup module to transmit a sequence of commands to the selected device to configure the selected device based on the generated configuration file.

7. The computer system for configuring a plurality of network devices based on a network topology architecture of claim 6, wherein executing the configuration setup module further causes a configuration file to be uploaded to the selected device the configuration file to be executed by the selected device.

8. A computer implemented method for configuring a plurality of network devices based on a network topology architecture, the method comprising:
receiving network topology data of a computer network that includes a plurality of network devices, the network topology data including at least data related to the logical arrangements of a plurality of network devices connected to the computer network;
automatically detecting a device template and an adjacency template by transmitting at least one command to each network device of the plurality of network devices, the command causing each network device to:
generate device information;
generate adjacency information describing the adjacent network devices of each device; and
transmit the device information and adjacency information to the computer system for configuring a plurality of network devices based on a network topology architecture;

processing a device template for each device type of the plurality network devices, the device template including device data for each device type;

processing an adjacency template for each type of adjacency in the network topology, each adjacency template including adjacency data at least describing connection of two or more network device types; and for each device of the plurality of network devices in the computer network, performing at least the following:
select a device from the plurality of network devices for configuration; automatically generate a configuration file for the selected device based on a device template and at least one adjacency template associated with the selected device; and
configure the selected device using the generated configuration file.

9. The computer implemented method for configuring a plurality of network devices based on a network topology architecture of claim 8, wherein the configuration file is generated based at least on the type of network devices adjacent to each selected network device.

10. The computer implemented method for configuring a plurality of network devices based on a network topology architecture of claim 8, further comprising:
receiving global variable data;
wherein the configuration file generated for each of the plurality of the network devices in the computer network is based in part on at least the global variable data.

11. The computer implemented method for configuring a plurality of network devices based on a network topology architecture of claim 8, further comprising:
receiving a modification to at least one of the network topology data, a device template associated with one or more of the plurality network devices, and a adjacency template;
for each device of the plurality of network devices in the computer network associated with the modification, performing at least the following:
select a device from the plurality of network devices for configuration based on the modification;
automatically regenerate a configuration file for the selected device based on a device template and at least one adjacency template associated with the selected device; and automatically configure the selected device using the regenerated configuration file.

12. The computer implemented method for configuring a plurality of network devices based on a network topology architecture of claim 8, further comprising:
detecting a new device to the computer network;
determining the device template of the new device based on a device type of the new device;
determining an adjacency template for the new device; and
for each adjacent device to the new device, performing at least the following:
automatically regenerate a configuration file based on a device template and at least one adjacency template associated with the adjacent device; and
automatically reconfigure the adjacent device using the generated configuration file.

13. The computer implemented method for configuring a plurality of network devices based on a network topology architecture of claim 12, further comprising:
for each non-adjacent device to the new device, performing at least the following:
automatically regenerate a configuration file based on a device template and at least one adjacency template associated with the non-adjacent device; and
automatically reconfigure the non-adjacent device using the generated configuration file.

14. The computer implemented method for configuring a plurality of network devices based on a network topology architecture of claim 8, further comprising: for each device of the plurality of network devices in the computer network, performing at least the following:
select a configuration file generation module from a library of configuration file generation modules based at least on a device type of the selected device, the selected module being executable by a computer processor; and execute the configuration file generation module to generate the configuration file for the selected device.

15. The computer implemented method for configuring a plurality of network devices based on a network topology architecture of claim 14, further comprising: for each device of the plurality of network devices in the computer network, performing at least the following:
select a configuration setup module from a library of configuration setup modules based at least on a device type of the selected device, the selected module being executable by a computer processor; and execute the configuration setup module to transmit a sequence of commands to the selected device to configure the selected device based on the generated configuration file.

16. The computer implemented method for configuring a plurality of network devices based on a network topology architecture of claim 15, wherein executing the configuration setup module further causes a configuration file to be uploaded to the selected device the configuration file to be executed by the selected device.

17. A computer system for configuring a plurality of network devices based on a network topology architecture, the system comprising:
non-transitory computer memory including stored executable computer instructions; a programmable processor, the programmable processor executing at least a portion of the stored executable computer instructions to perform at least the following:
receiving network topology data of a computer network that includes a plurality of network devices, the network topology data including at least data related to the logical arrangements of a plurality of network devices connected to the computer network;
processing a device template for each device type of the plurality network devices, the device template including device data for each device type;
processing an adjacency template for each type of adjacency in the network topology, each adjacency template including adjacency data at least describing connection of two or more network device types, wherein the adjacency data of each adjacency template is not associated with the computer network;
for each device of the plurality of network devices in the computer network, performing at least the following:
select a device from the plurality of network devices for configuration;
automatically generate a configuration file for the selected device based on a device template and at least one adjacency template associated with the selected device; and configure the selected device using the generated
    configuration file;
detecting a new device to the computer network;
determining the device template of the new device
    based on a device type of the new device;
determining an adjacency template for the new device;
for each adjacent device to the new device, performing
    at least the following:
    automatically regenerate a configuration file based
        on a device template and at least one adjacency
        template associated with the adjacent device;
    automatically reconfigure the adjacent device using
        the generated configuration file; and,
for each non-adjacent device to the new device, per-
    forming at least the following:
    automatically regenerate a configuration file based
        on a device template and at least one adjacency
        template associated with the non-adjacent device;
        and
    automatically reconfigure the non-adjacent device
        using the generated configuration file.

* * * * *